J. H. WILSON.
NUT AND BOLT LOCK OR FASTENER.
APPLICATION FILED JUNE 20, 1919.

1,332,015.

Patented Feb. 24, 1920.

INVENTOR:
John H. Wilson.
BY Diedersheim + Fairbanks
ATTORNEYS.

UNITED STATES PATENT OFFICE.

JOHN H. WILSON, OF PHILADELPHIA, PENNSYLVANIA.

NUT AND BOLT LOCK OR FASTENER.

1,332,015.

Specification of Letters Patent.

Patented Feb. 24, 1920.

Application filed June 20, 1919. Serial No. 305,616.

*To all whom it may concern:*

Be it known that I, JOHN H. WILSON, a citizen of the United States, residing in the city and county of Philadelphia, State of Pennsylvania, have invented a new and useful Nut and Bolt Lock or Fastener, of which the following is a specification.

My invention relates to a lock or fastener for a nut or bolt, or both nut and bolt applicable to a fish plate, rail fastening or other like member to be connected, and it consists in forming such member with a lock or fastening for the purpose stated integral with said member, whereby the lock or fastening cannot work itself loose and slip from the bolt and so be lost, while on the contrary, it will preserve its position and retain its locking or fastening feature on the nut and bolt.

The invention is satisfactorily illustrated in the accompanying drawing, but the important instrumentalities thereof may be varied, and so it is to be understood that the invention is not limited to the specific details shown and described, as long as they are within the spirit or scope of the claim.

Similar numerals of reference indicate corresponding parts in the figures.

Referring to the drawings:—

1 designates fish plates or rail fasteners, and 2 designate the bolts for connecting the same with the rails 3, said bolts being provided with the nuts 4 for tightening purposes usual in such cases.

5 designates a lock or a fastener for either of the nuts 4 and 6 designates a lock or fastener for either of the bolts 2.

Figure 2:
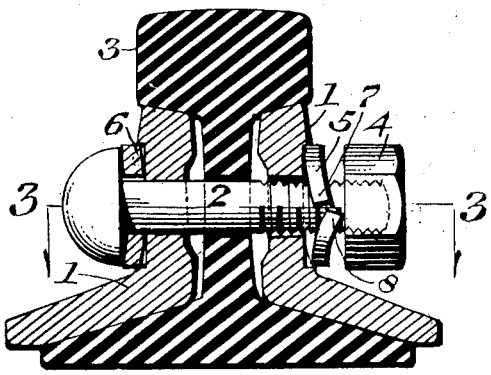
Fig. 2 represents a vertical section thereof.
Figure 3:
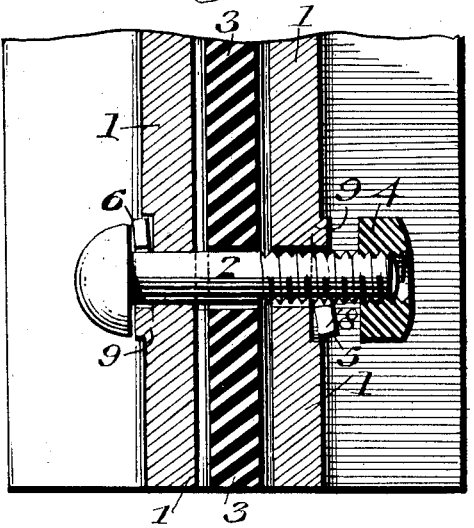
Fig. 3 represents a horizontal section on line 3—3 Fig. 2.
Figure 4:
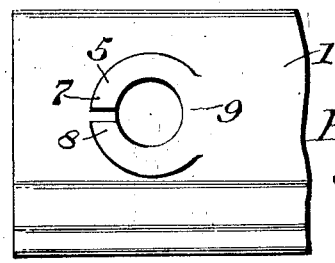
Fig. 4 represents a side elevation of a portion of a fish plate or rail fastening having thereon a nut or bolt fastening embodying my invention.

Each of said locks or fasteners consists of a ring shaped body of the form of a resilient spiral convolution which is separated or divided at a certain portion of the convolution providing two oppositely disposed terminals 7 and 8 independent of each other, the normal positions of which are shown in Figs. 2 and 3, it being seen that one of said locks or fastenings is between the nut and the adjacent plate 1, and the other lock or fastening is between the head of the bolt and the opposite plate 1.

When the nut is tightened the terminal portions of the ring are brought together, and the edges of said portions are compressed in one instance against the inner side of the nut and the adjacent plate 1, and the terminals of the other ring are brought together, and the edges of said portions are compressed in the other instance against the inner side of the head of the bolt and the adjacent plate 1, so that said edges of the two rings are caused to bite the contiguous portions of the nut, bolt head and plates 1 respectively, thus locking or fastening the nut and bolt and so preventing unscrewing thereof.

Attention is drawn to the fact that the resilient rings are integral portions of the outer faces of the plates 1 respectively, they being cut from the latter to partial extent and shaped leaving portions 9 connected with said outer faces of the plates, whereby the rings remain integral with the plates respectively and retain their resiliency having been properly tempered whereby said rings cannot be separated from said plates, and they are not liable to be lost from the bolts, it being known that separate rings of the character stated are liable to open or spread by the vibrations of the nut and bolt to which they are subjected when in use, and so they slip or work off from position thereby ending their service, this being prevented by my construction.

If desired, the rings may be primarily separate from the nut and bolt head, and certain portions of the same may be fixed to the plates by sweating, welding, or other means and so are integral members of the plates, as in the previous case.

Figure 1:
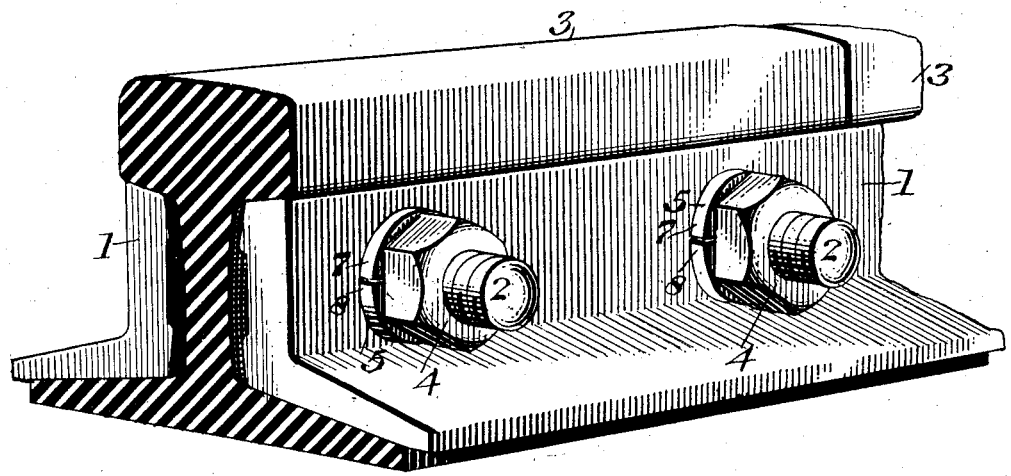
Figure 1 represents a perspective view of a nut and bolt lock or fastener embodying my invention.

In Figs. 2 and 3 the rings are shown in primary condition, the nuts not having been tightened and said rings not operatively compressed, as in Fig. 1.

Having thus described my invention what I claim as new and desire to secure by Letters Patent, is:—

A nut or bolt lock or fastener consisting of a fish plate or the like, and a resilient split ring on the face thereof, said ring having a portion set out from an adjacent portion of said face and another portion joining another portion of said face integral with the material of the latter, both portions being around the wall of the bolt opening therein.

JOHN H. WILSON.

Witnesses:
  JOHN A. WIEDERSHEIM,
  N. BUSSINGER.